United States Patent [19]
Kipple et al.

[11] 3,769,756
[45] Nov. 6, 1973

[54] AUTOMATIC GRINDING AND MACHINING APPARATUS

[75] Inventors: Harry P. Kipple, Pittsburgh, Pa.; Francis C. Kapperman, deceased, late of Eggertsville, N.Y. by Dorothy M. Kapperman, administratrix; Virgil J. Cozzarin, Clarence, N.Y.

[73] Assignee: Westinghouse Electric Corporation, Pittsburgh, Pa.

[22] Filed: Aug. 9, 1971

[21] Appl. No.: 170,006

[52] U.S. Cl. .................................. 51/43, 51/165.75
[51] Int. Cl. ............................................. B24b 5/06
[58] Field of Search ....................... 51/43, 165.75; 90/15 R

[56] References Cited
UNITED STATES PATENTS

| | | | |
|---|---|---|---|
| 2,458,765 | 1/1949 | Bryant | 51/43 |
| 2,505,812 | 5/1950 | Theimer | 51/165.75 |
| 2,458,472 | 1/1949 | Irwin | 51/43 X |
| 2,340,210 | 1/1944 | Armitage | 90/15 R |
| 2,639,562 | 5/1953 | Balsiger | 51/165.75 |
| 2,521,210 | 9/1950 | Fulmer | 51/43 X |

*Primary Examiner*—Harold D. Whitehead
*Attorney*—F. Shapoe

[57] ABSTRACT

Apparatus suitable for automatically positioning a stator and grinding a resinous coating from a cylindrical surface of a motor stator or for machining any surface of a member having a portion alignable with the machining or grinding means. The apparatus includes a rotatable horizontal shaft mounted on an upright frame, the frame being movable to and from a stator or member support table, the table being controllably movable vertically, laterally and angularly of the shaft in order to align the axis of a stator or a portion of a member on the table with the shaft, the shaft having a laterally-extending arm on the end nearer the table, a spindle adjustable movable on the arm to any radial position with respect to the shaft, a sensor detachably mounted on the spindle for measuring any non-alignment in any of the vertical, horizontal and angular directions of the stator axis or other member with respect to that of the shaft, operatively associated means between the sensor and the table for adjusting the support table so that the stator axis is brought into coaxial alignment with the shaft, and abrasion or machining means detachably mounted on the spindle and operable, for example, for grinding off a resinous coating on the stator surface as the laterally extending arm is rotated on the shaft and arm moves the abrasion means around and in contact with the stator surface.

17 Claims, 7 Drawing Figures

AUTOMATIC GRINDING AND MACHINING APPARATUS

CROSS REFERENCE TO RELATED APPLICATION

This invention is related to application Ser. No. 143,034, filed May 13, 1971.

BACKGROUND OF THE INVENTION

1. Field of the Invention

This invention relates to apparatus for automatically aligning a motor stator or other member in a desired position with respect to an abrasion or machining means and then grinding away a coating of cured resin from the stator surface or effecting a machining operation on the member.

2. Description of the Prior Art

Rotating electrical apparatus such as motors and generators, employ insulated coils comprising central core slot portions and end turn portions. The preparation of coils, windings, or conductors for insertion into slots of magnetizable cores by prior methods have involved the time consuming and costly process of applying insulation tape, wrappers, and slot cell liners to the coil portions, such as disclosed in U.S. Pat. No. 3,054,880. The process was particularly involved, time consuming and costly where it was employed in the repair of coils for motors and generators.

A method that would eliminate or reduce the amount of taping and wrapping required for producing all types of rewound rotating apparatus would be desirable. In addition to reducing the labor required in the rewinding of the electrical apparatus, a reduction of subsequent treatment cycles has been sought. More particularly, in the area of form-wound coils for stators, rotors, and armatures, with, for example, direct current fields and rotating fields, the methods remain the same; i.e., mostly hand-taping of assembled conductors, varnish treatment, and approximately 12 hour baking cycles.

The foregoing problems are of greater moment where repair shops for such apparatus are involved. Repair shops handle apparatus of various sizes and are therefore necessarily faced with the necessity of preparing and applying a wide variety of non-standardized coil shapes and sizes and using different varnishes requiring different modes of application and curing procedures. For example, repair shops must be prepared to handle components of rotating apparatus varying in diameter from about 6 inches up to 6 feet or more, and manufactured at a time going back as much as 50 years or more. In such circumstances, the repair methods employed must be flexibly and readily adapted to a maximum output at a minimum cost.

More particularly, where it is expedient to spray powdered resin onto coils of a motor or similar electrical devices automatically, such as shown in application Ser. No. 143,034, filed May 13, 1971, the powdered resin is applied not only to the coils but also onto adjacent areas including the bore surfaces of a motor stator in order to facilitate the deposition of a predetermined thickness of a resinous coating on selected areas of a coil and into the coil slots in the core. Thereafter, any spillage or application of resin upon undesired areas such as the bore surface of the core of the stator must be removed since the stator must allow the rotor to operate closely to its surface without contact therebetween. If removal of the resin from the undesired areas were dependent upon manual methods it would not be expedient or economical to apply the resinous coating to the coils.

While the apparatus has been especially designed to enable excess resin to be ground off of a stator bore, the apparatus lends itself to grinding or machining any alignable portion of a stator or other member. The alignment in any of the horizontal, vertical and axial directions of the stator or other member to the grinding or abrasion means or a machining tool such as a milling cutter, can be automatically and readily carried out. While the description hereinafter will be directed to the removal of excess resin from the bore surfaces of a stator, it will be understood that any machining of a surface of a member may be similarly effected.

SUMMARY OF THE INVENTION

It has been found in accordance with this invention that the foregoing problems may be overcome by employment of an apparatus for automatically precisely grinding the resinous coating from the metal core surfaces of the bore of a motor stator.

Broadly, the invention comprises apparatus for working with a tool some portion of a member such as a stator which portion requires alignment with the tool, the apparatus comprising a base on which is mounted a frame for linear reciprocating movement to and from a support table, also on the base, on which is mounted the member to be worked, and means for moving the support table vertically, laterally in a horizontal plane, and angularly about a vertical axis so as to enable the member to be moved therewith so as to align said portion with the axis of a rotatable tool support means carried by the frame. The rotatable tool support means comprises an arm movable along a radius with respect to said axis, and means on the arm for supporting the tool and a sensing means. The sensing means can determine any misalignment of the said portion of the member and is operatively associated with the means for moving the support table so as to move the support and the member thereon to precisely align the portion of the member with the axis of rotation. The arm includes an adjusted lever mechanism for moving the tool and sensing means a small distance for fine positioning.

More specifically, the apparatus includes a rotatable horizontal shaft suitably mounted on an upright frame, a stator support table having means for controllably moving the table vertically, laterally, ad about a vertical axis with respect to the axis of the shaft in order to align the axis of the bore of the stator with the shaft, means for reciprocating the frame and table toward or away from each other, the shaft having a laterally extending arm on the end nearer the table, a spindle on the arm and being adjustably rotatably movable thereon to any position about the shaft, sensor means detachably mounted on the spindle for measuring any eccentricity of alignment of the stator axis with respect to that of the shaft, means between the sensor and the table for adjusting the stator axis into coaxial alignment with the shaft, and abrasion means detachably mounted on the spindle for grinding away a resinous coating as the rotating arm moves the abrasive means around the stator surface.

The advantage of the apparatus is that it is automatically operative to align the stator precisely with respect to the shaft axis and operable to remove excess cured resin from the surface of the bore of a stator and which apparatus is adapted for use with stators of different sizes, such as are being processed in a motor repair shop with precision and at a high output and with a low cost.

DESCRIPTION OF THE PREFERRED EMBODIMENT

Figure 1:
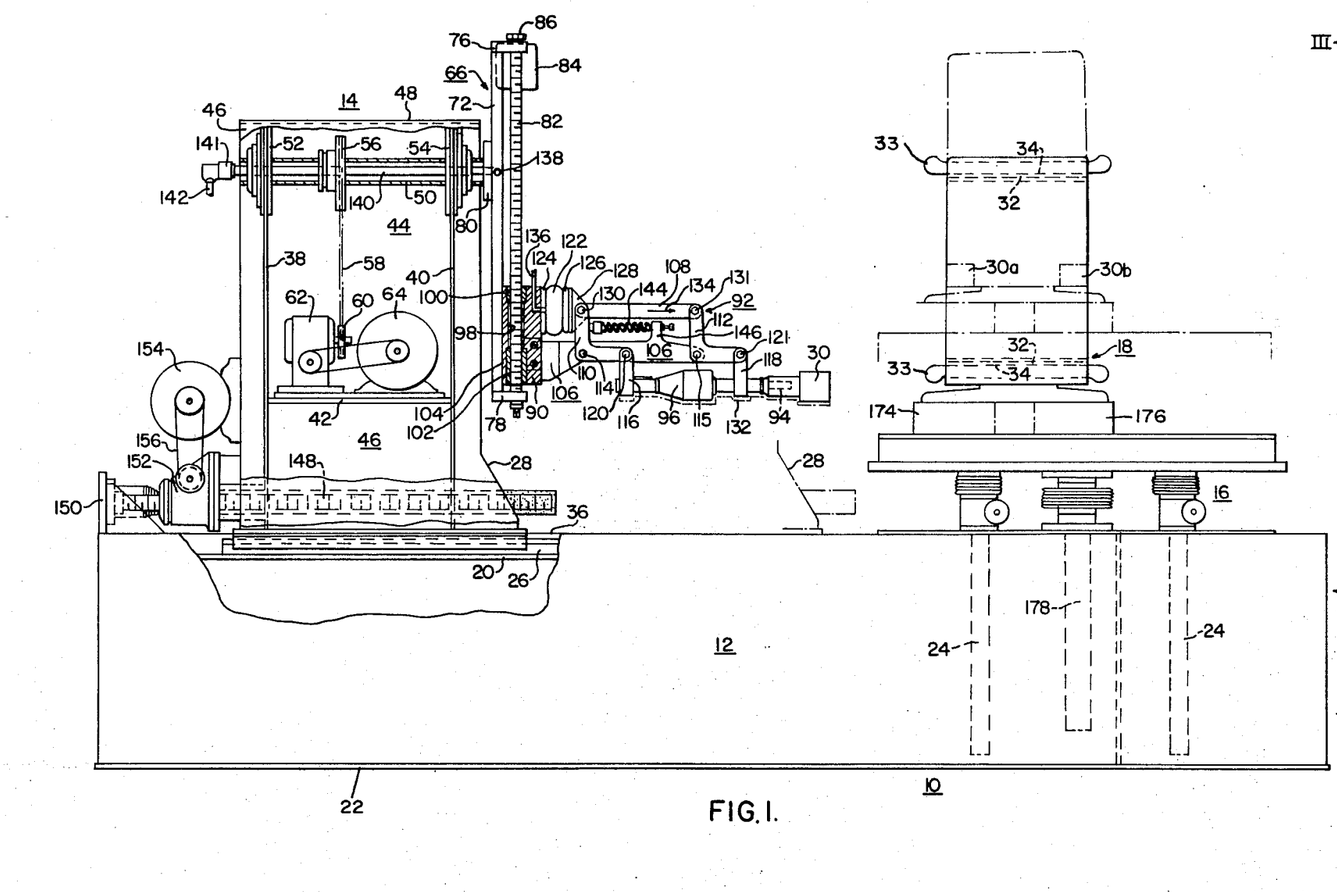
FIG. 1 is an elevational view, partly in section, of the apparatus of the present invention.

The apparatus of the present invention is generally indicated at 10 in FIG. 1, and it includes a base 12, a grinder support frame 14, and a lift table 16 for supporting a motor stator 18.

Figure 2:
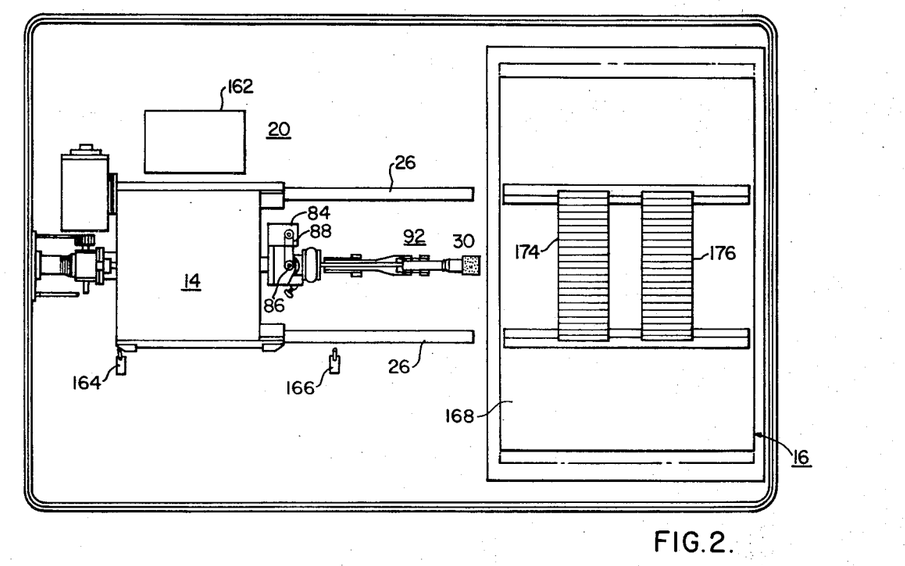
FIG. 2 is a plan view on a smaller scale than FIG. 1 of the apparatus.

The base 12 includes an upper support plate 20 disposed at a distance above a floor plate 22 in order to provide clearance for a plurality of jack screws which are used for raising and lowering the lift table 16. The upper support plate 20 carries a pair of spaced tracks 26 (FIG. 2) on which the support frame 14 is mounted for reciprocating movement to and from table 16. As shown in FIG. 2 the tracks 26 extend longitudinally on the support plate 20 and in the direction of the lift table 16, whereby the frame 14 is movable toward the lift table up to a position indicated by broken lines 28. Though the frame 14 is disclosed as being movable toward and away from the table, it is understood that alternatively the table may be movable to and from the frame.

Figure 7:
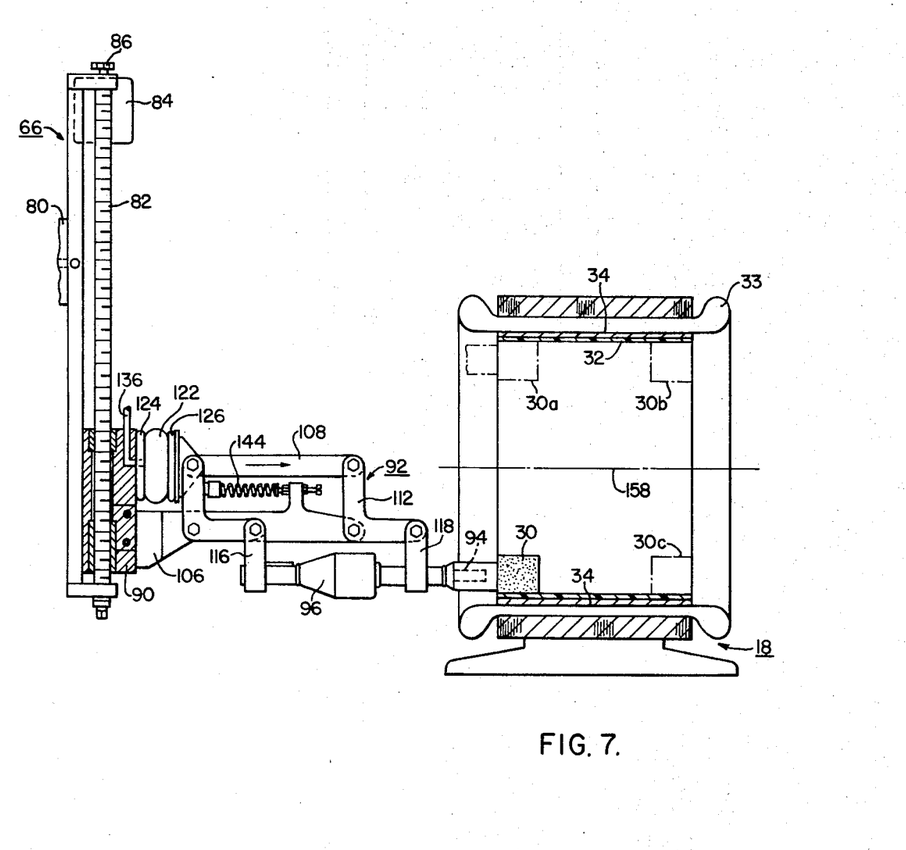

More particularly, the support frame 14 is a mounting means for a circular grinding wheel 30 which during use is positioned by the frame into the stator 18 such as indicated by broken line positions 30a and 30b in FIG. 1 and FIG. 7, for grinding away a layer 32 of cured resin which has been applied onto the bore surface 34 of the stator when it was applied as insulation for the coils and windings 33 of the stator. For such longitudinal reciprocating movement, the support frame 14 includes a support 36 which slidably engages the tracks 26, a pair of spaced upright support members 38 and 40 and a horizontal plate 42 attached to and extending between the members 38 and 40. The frame 14 also includes side housing plates 44 and 46 as well as a top plate 48.

As shown in FIG. 1 a shaft 50 is rotatably mounted in suitable bearings 52 and 54 on and between the support members 38 and 40. A sprocket 56 is mounted on the shaft 50 and is driven by a continuous link chain 58 which extends over and between said sprocket and a sprocket 60 at the output end of a speed reducer 62 which is driven by a motor 64. The speed reducer and the motor being mounted on the plate 42.

Figure 3:
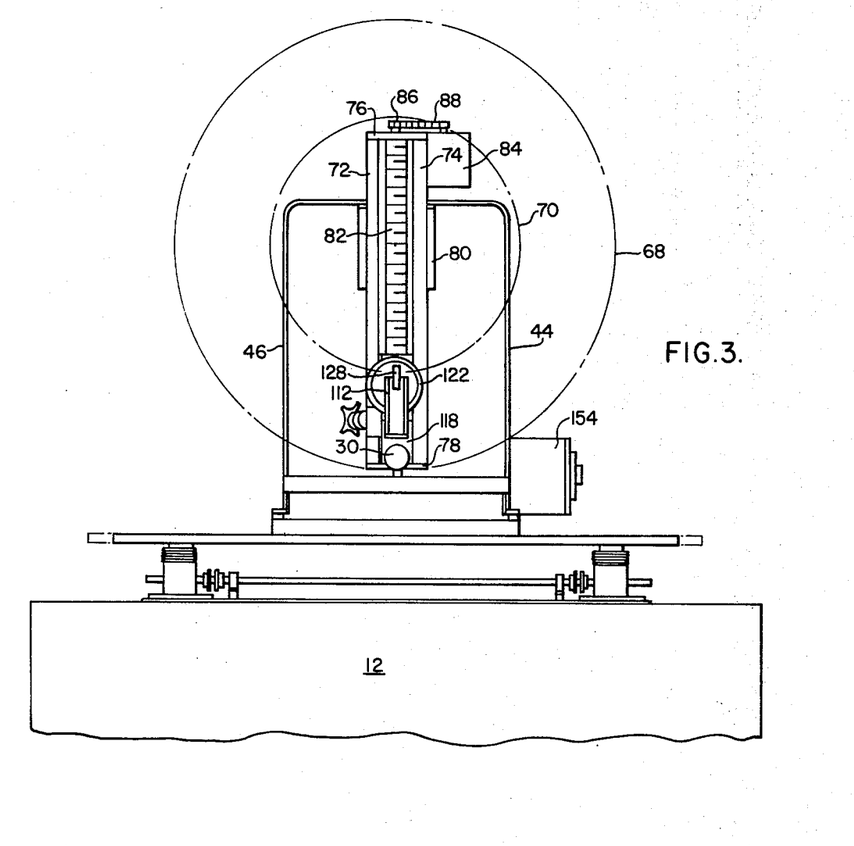
FIG. 3 is an end view of the table portion of the apparatus without a motor stator thereon taken on the line III—III of FIG. 1.

The right end of the shaft 50 projects beyond support 40 and carries means for supporting and rotating the grinding wheel 30 in desired circular positions such as within the stator 18. Such means includes an arm generally indicated at 66 which is fixedly attached to the ends of the shaft 50, whereby the grinding wheel 30 may be rotated in any circular path of travel from the axis of shaft 50 to the circle 68 as indicated in FIG. 3. As shown in FIG. 1 a shorter portion of the arm is disposed on the upper side of the axis of the shaft 50 while a longer portion carrying grinder 30 is disposed on the lower side thereof so that as the arm rotates the extremity of the shorter portion at 86 describes a fixed circular path of travel 70 (FIG. 3). As shown in FIGS. 1 and 3 the arm 66 includes a pair of elongated support members 72 and 74 the upper and lower ends of which are secured together by similar end plates 76 and 78, respectively. The support members 72 and 74 are attached to a mounting plate 80 which in turn is fixedly secured to the right end of the shaft 50 as viewed in FIG. 1.

A screw threaded shaft 82 is disposed between and rotatably mounted in the end plates 76 and 78 and is provided with drive means at the upper end which means includes a reversible motor 84, a sprocket 86 fixed to the upper end of the screw threaded shaft 82 and a drive chain 88 (FIG. 3) engaging sprocket 86 and driven by the motor. Accordingly, the screw 82 may be rotated either clockwise or counterclockwise by operation of motor 84.

The means by which the grinding wheel 30 is attached to the arm 66 includes a slide or mounting block 90 and a bell crank linkage assembly generally indicated at 92 for mounting of the grinding wheel 30 on the outer end of a spindle 94 of a motor 96 which may be an air driven or an electrical motor. The slide 90 has bearing surfaces slidably contacting the support members 72 and 74. The slide 90 has a bore 98 through which the screw 82 extends, and suitable bearings 100 and 102 are provided at upper and lower ends, respectively, of the bore 98. In addition, a threaded nut 104 rigidly fixed to slide 90 engages the screw 82 so that rotation of the screw by motor 84 causes the slide 90 to move along its length.

Th slide 90 has affixed an outwardly extending arm 106 carrying the linkage assembly 92. The linkage assembly 92 comprises a pair of bell crank levers 110 and 112 mounted on pivot pins 114 and 115 with an upper link 108 connecting the upper ends of the bell cranks 110 and 112. Pivot pins 114 and 115 are on a line parallel to the axis of shaft 50. A pair of clamps 116 and 118 are attached by pivot pins 120 and 121 to the other ends of the levers 110 and 112, respectively, for holding the motor 96 in place. The arrangement of the bell crank levers, link 108, and pivot pins 114, 115, 130, and 311 is such that the spindle 94 is on an axis substantially parallel to that of the shaft 50.

The link assembly 92 is actuated for movement by an inflatable bellows member 122, which may comprise a rubber bladder or a corrugated metal cylinder, which is disposed between a pair of mounting plates 124 and 126, the former of which is secured to one side of the slide 90 and the other of which is mounted on a mounting member 128 to which the link 108 and the lever 110 are pivotally attached by a pin 130. In the deflated position of the bellows 122 the motor 96 and the grinding wheel 30 are in retracted position as shown in FIG. 1. However, when the bellows 122 is inflated link 108 and the bell crank levers move clockwise and the pivot pins 120 and 121 drop down so that the motor 96 and the grinding wheel 30 are moved radially downwardly outwardly to a position shown by the broken line 132, thereby facilitating insertion and adjustment of the grinding wheel 30 within the stator 18 to control the depth of grinding of the stator. The link assembly 92 is actuated to provide parallel linkage motion to the motor 96 and the grinding wheel 30 upon movement of the link 108 in the direction of the arrow 134 in response to inflation of the bellows 122.

As shown in FIG. 1 an air pressure conduit 136, extending through the slide 90, communicates with the interior of the bellows 122, and by intermediate flexible conduit means (not shown) is connected to an outlet 138 which communicates in turn with a conduit 140 extending through the shaft 50 to the left extremity thereof where it connects with an air tight slip coupling 141 connected to conduit 142 which extends to a source of compressed air or gas such as at pressure from about 1 to 10 pounds per square inch. A helical compression spring 144 which is disposed between the upturn portion of the lever 110 and a portion 146 of the arm 106 tends to pull the link assembly 92 back to the original position when the bellows 122 is deflated with the link 108 moving in the opposite direction to the arrow 134, whereby the motor 96 and the grinding wheel 30 are returned to the solid line positions as shown in FIG. 1. The purpose of the air inflatable bellows 122 is to apply a yielding or resilient pressure to the grinding wheel 30 so that there is sufficient force to enable the layer 32 of cured resin to be ground off from the surface 34 of the stator. However, when the resin layer 32 is removed and the harder metal surface 34 is exposed it resists the abrasive action of the grinding wheel 30 at such light pressure and a minimal amount of metal is abraded. A maximum pressure of, for example, 7 psi in the relatively small area bellows 122 is sufficient to enable the wheel 30 to be effective in removing the softer cured resin layer but less effective to remove the metal surface. However, in machining metal, higher pressures may be applied to a larger bellows so that a grinding wheel or milling cutter may be more effective.

The support frame 14 is movable over the tracks 26, to which it is secured in a conventional manner such as by interlocking dogs or roller portions fitting under a head or the tracks, by means which include threaded screw 148, the left end of which is secured rigidly to an upright member 150 extending from the support plate 20. An axially restrained rotatable threaded nut (not shown) within a housing 152, engages the screw which nut is driven by a reversible motor 154 mounted on the frame and a drive belt 156 which rotates a worm gear which engages a geared periphery on the nut. Energization of motor 154 causes the nut to turn and by its threaded engagement with screw 148 causes the frame 14 to move to the left or to the right as seen in Fig. 1.

Figure 6:
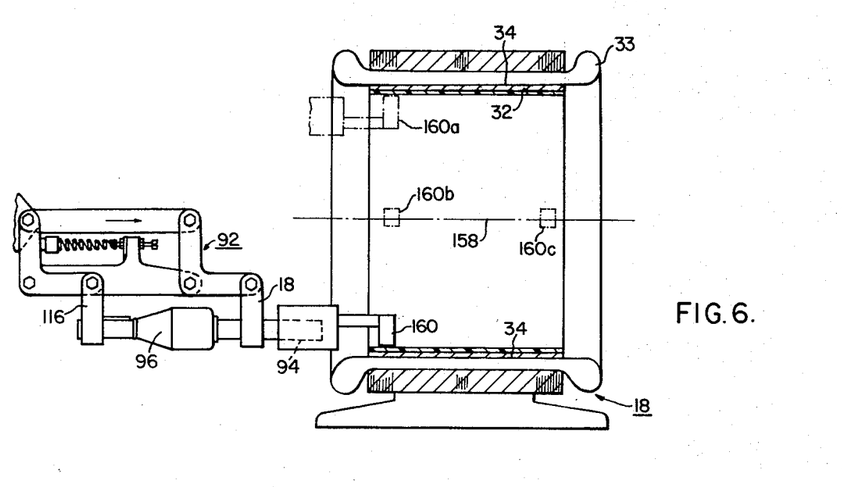
FIG. 6 is a fragmentary elevational view of the mounting means for the spindle comprising a grinder motor and showing the manner in which a sensing device may be mounted to facilitate the proper alignment of the motor stator (shown in section) with respect to the spindle and FIG. 7 is a fragmentary view similar to FIG. 6, showing a grinder in operative position.

The lift table 16 has the function of placing the center axis of the stator in vertical alignment with the axis of the shaft 50 so that the axis of the cylindrical bore surface 34 of the stator is concentric with the path of travel 68 (FIG. 3) of the grinding wheel 30 during operation thereof. The lift table is provided with means for moving the table in three different directions; namely, vertically, transversely in a horizontal plane, and for making angular or skew adjustments to the axis of the shaft 50. The grinding wheel 30, being mounted for movement in line with the tracks 28, moves only horizontally toward and away from the lift table and more particularly the motor stator 18. Referring to FIG. 6 the means for precisely aligning the axis 158 of the stator 18 with the axis of the shaft 50 includes a proximity switch or sensor 160 mounted on spindle 94 and associated with it are means operatively associated with the lift table 16 for moving the table vertically, horizontally and in skew adjustment. The sensor 160 may comprise a magnetic switch that detects all electro-conductive metals which enter its magnetic field. A suitable sensor for this purpose is one of a line of proximity switches for detecting ferromagnetic metal such as made and sold by Micro-Swtich, a Division of Honeywell, Corp. of Freeport, Ill. When a stator 18 is placed on the table its axis 158 is located by the visual observations of the operator as proximate to the axis of the shaft 50 as possible. Thereafter the support frame 14 is moved towards the stator and the sensor 160 is placed in position substantially as shown in FIG. 6. Although the sensor 160 is shown as a separate attachment on the spindle 94 of the motor 96, the sensor may be a part of the assembly of the housing in which spindle 94 rotates, and the sensor may be movable into and out of operative position on a pivot on the housing. During use of the sensor 160, the motor 96 is not operating; rather the shaft 50 is turned to enable a magnetic flux transmitted by the sensor to sense the proximity (say, within ¾ inch) of the surface 34 of the ferromagentic portion of the stator 18 and a voltage is produced proportional to the distance of the sensor to the ferromagnetic material. As the arm 66 (FIG. 1) is rotated the senor 160 is slowly rotated in a circle around the axis of the shaft 50 and any misalignment of the stator with respect thereto is detected by the sensor and a variable voltage is transmitted to a receiver 162 (FIG. 2) which also has a signal as to the position of arm 66 on shaft 50 and thus senses the voltage variation and its position and which in turn transmits an electrical output to one of the mechanisms associated with the table 16 to correct the out of alignment by elevating, moving horizontally or turning table 16.

When the sensor 160 moves from the lower position as shown in FIG. 6 to the upper position 160a, any voltage variation generated causes receiver 162 to actuate the means for lifting or lowering the table to a desired position of less voltage variation (i.e., move the stator away from that point at which the sensor is closest to the stator bore surfaces). On the other hand when the sensor 160 is in horizontal position such as position 160b on the right or left side of the stator 18, means for moving the table transversely on a horizontal plane with respect to the axis 158 are actuated by the receiver porportional to the voltage variation; so that the stator bore is not as close to the sensor as its previous position. Finally, when the sensor 160 is advanced from the front to the back of the stator, that is, to the right within the stator to a position 160c (FIG. 6), any misalignment of the right-hand end of the axis 158 as compared with the axis of the shaft 50 is corrected by the receiver 162 energizing the means associated with the table 16 for making skew or angle adjustments of the stator by rotating the table 16 about a vertical axis.

Several procedures may be followed in employing the sensor 160 to align the stator in full axial parallelism with shaft 50. The arm 92 with sensor 160 may be rotated at the front end of the stator bore 34 and the table 16 moved until the front end of the stator is centered about shaft 50. The arm 92 may then be stopped from rotating and the sensor 160 left in a position halfway up, namely at the midline of one side or the other of the stator, and the frame 14 caused to move the sensor 160 toward the back of the bore 34. If in the front to back movement of the sensor 160, the bore wall either approaches or recedes from the sensor, the voltage output of the sensor will vary correspondingly and the receiver 162 will put out a signal to rotate the table 16 until the path of the sensor is at a constant distance from the adjacent bore wall. The sensor 160 is then caused to revolve; for example about the mid point of the bore, and any horizontal misalignment will be sensed by the sensor 160, the receiver 162 caused to send appropriate control signals to the horizontal actuators of the table 16 so as to move it, the axis 158 of the stator 18, into axial alignment with the shaft 50. If necessary for the most precise alignment, these relative sensor movements may be repeated to make five corrections.

Alternatively, the sensor is initially moved back and forth at about the mid-point of the bore and the table 16 rotated to get the bore axis parallel to shaft 50. Thereafter the sensor is revolved at the front or back ends of the bore so as to enable the table 16 to be moved up or down, and sideways to secure exact alignment of the axis of the stator with the shaft 50. Adjustments can be made for transverse settings as well as skew adjustments of table 16 by a combination of automatic and manual operations of the proximity sensor 160, until the axis 158 of the stator is brought into substantial alignment within a 0.01 of an inch or so with the axis of the shaft 50. Thereafter the aligned stator is ready for grinding away the layer 32 of resin from the inner cylindrical surface 34 of the stator.

The grinding wheel 30 is composed of a suitable abrasive, in the form of a solid abrasive grinding wheel or an abrasive belt, or even a stiff wire brush. The particles of abrasive materal in the wheel or belt may be composed of a suitable material such as silicon carbide or alumina. The grinding wheel 30 moves both by rotation of shaft 50 and arm 92 so that it contacts the interior of the stator as shown in FIG. 5 and by being rotated by the motor 96 whereby the abrasive contacts the resin layer 32 by appropriate air pressure in the inflated bellows 122.

As resin is ground off, the bellows 122 automatically moves the grinding wheel 30 radially outwardly on the arm 66 in order to contact additional resin in the layer 32 close to the surface 34 of the stator. When the layer 32 is removed, the grinding wheel 30 is moved, either by manual control or automatically from position 30a ultimately to position 30b as shown in FIG. 7 by actuating the motor 154 (FIG. 1) to drive the frame to the right as viewed in FIG. 7. As evident from FIG. 2 limit switches 164 and 166 are set to control the movement of frame 14 on tracks 26 to correspond to the width of the stator, and the horizontal movement of the frame 14 is stopped at the set limits by the switches turning off motor 154.

LIFT TABLE

Figure 4:
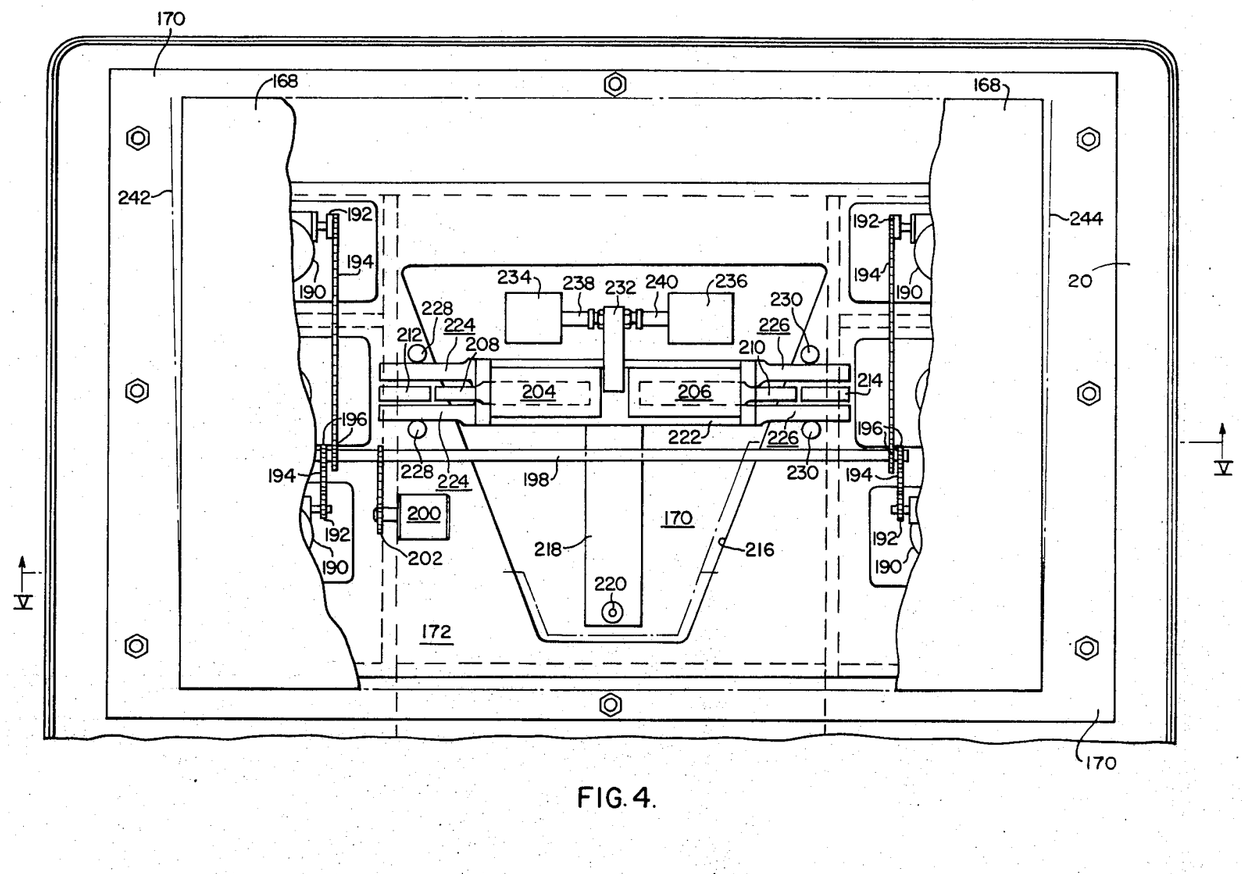
FIG. 4 is an enlarged plan view of the lift table with the center portion of the platform broken away, taken on the line IV—IV of FIG. 5.
Figure 5:
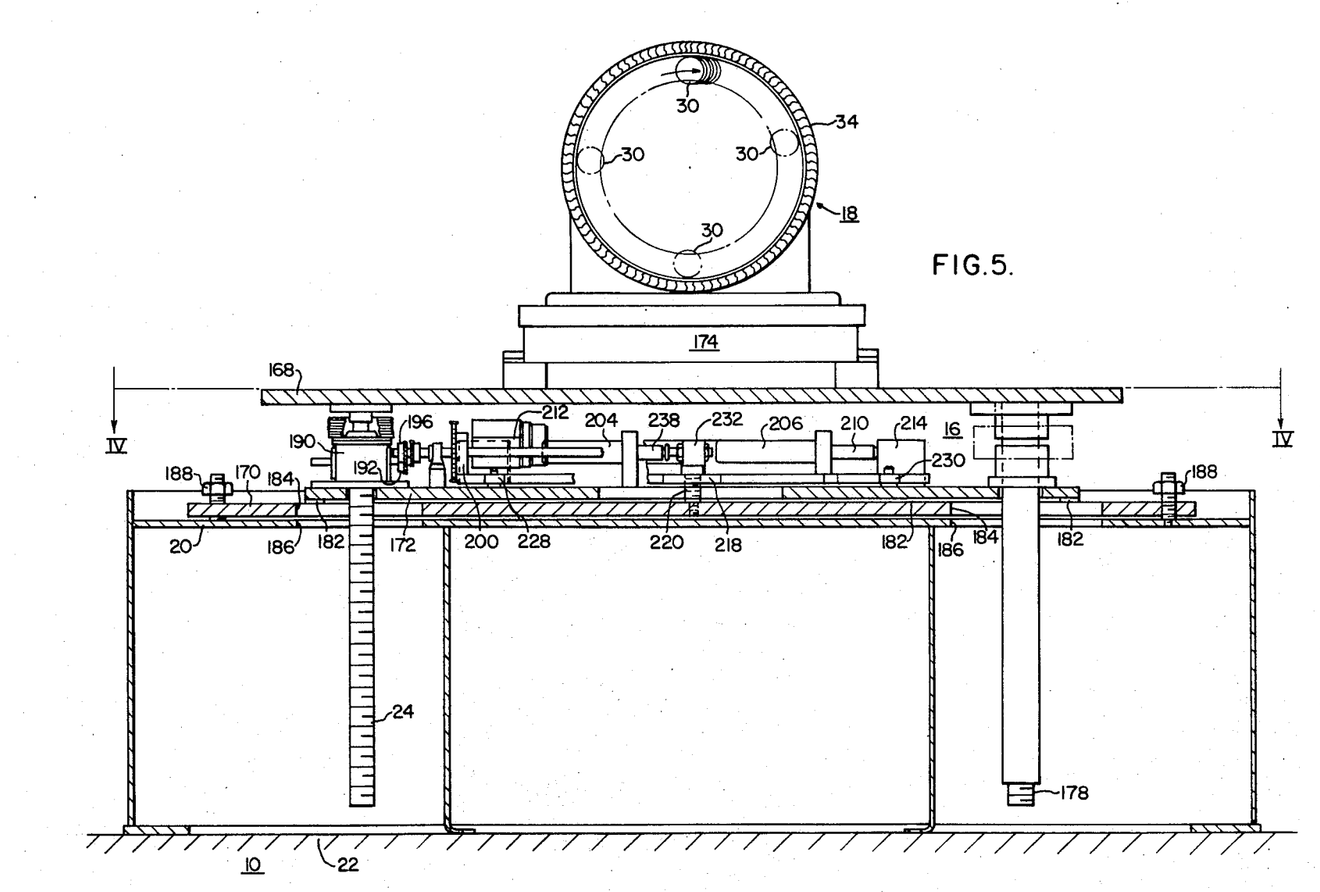
FIG. 5 is a vertical sectional view, taken on the line V—V of FIG. 4, and showing a motor stator mounted on the platform.

As shown in FIGS. 4 and 5 the lift table 16 includes a table 168, a base plate 170, and a platform 172 pivotally mounted on the base plate 170, all supported on plate 20. The table 168 supports a pair of spaced electromagnets 174 and 176 (FIGS. 1, 2 and 5) on which the stator 18 is mounted and held in place when the electromagnets are energized. Obviously, clamps or nut and bolt assemblies may be utilized to hold stator 18 on platform 172. The table 168 is supported by four screw jacks 24, one near each corner of the table as well as a pair of guide rods 178 and 180, one of which is disposed between one pair of screw jacks and the other of which is disposed between the other pair of screw jacks. The platform 172 below the table 168 is slidably mounted on the plate 170 and friction between the platform and the plate is minimized by the provision of bearing strips 182 which are attached to the undersurface of the platform at the four peripheral edges thereof. The bearing strips 182 are preferably composed of material having low friction properties such as nylon or polytetrofluoroethylene resin.

The lower end of the screw jacks 24 and the guide rods 178 extend through relatively large corresponding apertures in the platform 172 as well as through aligned apertures 184 and 186 in the plates 170 and 20, respectively. The plate 170 is fixedly secured to the support plate 20 by several spaced nut and bolt assemblies 188.

Each screw jack 24 is coupled with a nut assembly 190 through which the screw jack extends to the undersurface 168 where it is rigidly secured. Each nut assembly 190 includes a sprocket 192 which is actuated by similar link chains 194 each of which is driven by spaced sprockets 196 on a common drive shaft 198. The shaft 198 in turn is driven by a reversible motor 200, operating through a chain 202, attached to a gear sprocket in a conventional manner. Obviously, gear drives may be employed instead of the chain and sprocket drives. When the motor 200 is energized from the receiver 162, the four nut assemblies are rotated either clockwise or counterclockwise depending upon the voltage signal from the proximity sensor 160 which in turn depends on the difference in the distance of the metal surface 34 of the rotor 18 (FIG. 6) in the lower position to the upper position 160a of the sensor.

The means for moving the table 168 to the right or left as viewed in FIGS. 4 and 5 comprises a pair of hydraulic cylinders 204 and 206 having movable piston rods 208 and 210, respectively, projecting therefrom. One of the rods 208 or 210 is driven against a push block 212 or 214 mounted on the upper surface of the platform 172, so that when hydraulic fluid pressure in either cylinder 204 or 206 exceeds that of the other cylinder, the platform 172 is pushed in that direction. Accordingly lateral movement in a horizontal plane is accomplished.

As shown more particularly in FIG. 4, the platform 172 is provided with a keystone shaped aperture 216 with T-shaped lever arm 218 disposed over the aperture and pivotally mounted on a pin 220 which is secured in the plate 170. The hydraulic cylinders are mounted on the lever arm 218. The lever arm 218 includes a transverse portion 222 extending from opposite sides of the axis thereof and the opposite end of each portion is bifurcated to provide a pair of similar spaced prongs 224 and 226. Each pair of the prongs is disposed between similar pairs of guide pins 228 and 230, respectively, secured in the platform 172. As shown in FIG. 4, the push block 212 is disposed with a spaced clearance between the spaced prongs 224 so that upon actuation of the cylinder 204 the rod 208 pushes against the block 212 to slide the paltform 172 to the left as viewed in FIG. 4. Similarly, the push block 214 is disposed between the prongs 226 so that the platform may be moved in the opposite direction upon actuation of the piston rod 210. To facilitate precise right or left transverse movement of the platform the pins 228 and 230 bear against the surfaces of the corresponding prongs 224 and 226. The pistons 204 and 206 are actuated in response to an energizing signal from the receiver 162 generated by a voltage signal from the proximity switch when it senses a difference in the horizontal spacing between the sensor and the stator wall 32 in positions 160b as shwon in FIG. 6.

The means for skew or angular adjustment of the lift table includes an adjustment block 232 secured to the end of the lever 218 remote from the pivot pin 220 and a pair of similar hydraulic cylinders 234 and 236 having pistons rods 238 and 240, respectively, attached to platform 172. The cylinders 234 and 236 extend upwardly through the aperture 216 so that the piston rods 238 and 240 contact opposite sides of the block 232. Accordingly, appropriate upon an energizing signal from the receiver 162, as a result of an appropriate sensor voltage pulse one of the cylinders 234 and 236 receives more hydraulic pressure than the other and its piston rod moves the block 232 to the right or left as viewed in FIG. 4, thereby rotating the platform 172 about the pivot pin 220 whereby to provide better alignment of the stator axis 158 with the axis of the shaft 50. For that purpose only slight adjustments are usually necessary, such as up to about 4° of either side of the axis of the lever 218 thereby moving the opposite ends of the table 168 to the broken line positions 242 or 244 on the left or right of the table as viewed in FIG. 4.

In operation the apparatus 10 provides means for automatically positioning a stator in a precise alignment as desired with the axis of the shaft 50 so that a grinding wheel may be energized for removing a layer of cured resinous material from the inner surface of the stator on which excessive amounts of resin are present. Only a minute or less is required to align a stator with excellent precision. The apparatus of the present invention constitutes a highly satisfactory means for eliminating the time consuming manual methods of aligning a stator and mechanically processing its bore. Fast and economical, as well as precise removal of the insulation during the repair of a motor or generator is accomplished as compared to what was previously known in the prior art.

The hydraulic cylinders 204, 206, 234 and 236 are supplied fluid under pressure from a suitable source, for example, from a central hydraulic tank holding fluid under a high pressure to which each cylinder is connected by a conduit with an electrically controlled solenoid or motor driven valve which opens or closes upon the appropriate energization from the receiver 162 so as to convey the fluid to the appropriate cylinder. Alternatively, each pair of pistons is connected to a hydraulic pump operated by a reversible electric motor which operates upon receipt of an energizing signal from receiver 162 to pump fluid under pressure to the appropriate cylinder. When the table 168 has been moved to a position where the sensor 160 does not generate a voltage, the receiver closes the valves or stops the motor operation.

It will be appreciated that electric motors driving a screw and nut arrangement can be substituted for the hydraulic pistons 204, 206, 234 and 236 with equally good results.

The receiver 162 comprises suitable amplifiers and control equipment well known in the synchro- and servomechanism art. Briefly, the receiver 162 receives a position signal corresponding to the angular position of linkage 92 and sensor 160 with respect to the stator.

The voltage output of sensor 160 is then compared with the angular position of the sensor to the bore of the stator, and either or both motors 200 and hydraulic cylinders 204 and 206 are caused to operate to move table 168 to move up or down or sideways. The receiver also receives a signal from the back and forth movement of frame 14 and compares this with the voltage output of the sensor as it deviates its separation or spacing from the stator wall and any voltage generated by the sensor is appropriately amplified and produces an energization signal to hydraulic cylinders 234 and 236 to skew table 168 so that the stator bore is parallel to the shaft 50. Receivers to accomplish these functions are well known and available. Thus a two-stage DC servo amplifier such as is disclosed on pages 2–29 to 2–32 in "Basic Synchros and Servomechanisms" by Van Volkenburgh, Noogle and Neville, Inc. published in 1955 by John F. Rider Publisher, Inc. may be employed, the voltage pulse from the sensor constituting the error signal supplied to transformer T-1. Three of these circuits, one for each motor, are used.

In operating the apparatus so as to enable the voltage signals from the sensor 160 to the receiver 162 and then to the several adjusting motors 200 and 234 and 236 on lift table 16 to cause the platform 172 to move whereby the axis of stator 18 is aligned coaxially with the shaft 50, various techniques and a variety of electronic equipment may be used. As one example, the voltage outputs from sensor 160 as it rotates within the core of the stator 18 can be separated into three components. Two of the voltage components which can be employed to raise or lower the table and move the table sideways, are the following: one compares the voltage output at the top (or 0° position) and bottom (or 180° position) of the sensor with respect to the stator, and the other compares the voltage output at the front and back (or 90° and 270°) positions of the sensor with respect to the stator. This separation of the voltage outputs of the sensor can be readily accomplished, for instance by providing a circular slip ring having four metal contact segments on the 0°, 90°, 180° and 270° points on the ring which correspond to the same points or position on the stator, with electrical insulation between the metal contact segments. The slip ring is contacted by a rotating arm having a contact brush connected by a lead to sensor 160 moving in synchronism with the rotation of shaft 50, for example, by a selsyn driver on shaft 50 and a selsyn motor driving the contact arm, so that the contact brush passes voltage from the sensor to the 0° contact segment when the sensor is at the top of the stator bore, and so on. The 0° and 180° contact segments on the slip ring are connected to a suitable digital voltmeter or equivalent device so that the differences in the sensor voltage between the voltage at the 0° and at the 180° contact segments is established. The digital voltmeter output is then fed to a selsyn motor (or the equivalent) to cause it to operate to raise or lower the table, depending on the sign of the voltage difference, to an extent that the sensor voltage would be reduced by half the voltage difference. The operation of the selsyn motor will usually have a feedback cancelling the voltmeter reading and reducing it to zero when the table has been moved vertically to the desired height. A similar digital voltmeter connected to the 90° and 270° contact segments, stresses the voltage difference and causes a selsyn or equivalent motor to move the table sideways to a sufficient extent that the voltage would be changed by half the digital voltmeter reading at the front and back of the stator.

With each revolution of the sensor, the digital voltmeters and the motors they control will make successively finer adjustments, if any are needed, so that after a few revolutions at most the axis of the stator is within a very close coaxial alignment with shaft 50.

To adjust for angular misalignment of the stator with shaft 50, the frame 14 is moved to and from the stator, preferably with the shaft 50 held stationary with the sensor located at the front or back of the inside surface of the stator core on a horizontal plane through the stator axis. The to and fro motion of the sensor generates a third voltage component which varies if there is any difference in the distance of the metal stator core wall in this horizontal traverse of the sensor 160. To secure this third voltage component, the sensor output is switched so that it does not go through the slip ring contacts, but is fed to a third digital voltmeter at which the maximum voltage difference is sensed and the digital voltmeter output is caused to actuate the angular adjustment mechanism cylinders and pistons 234, 236, 238 and 240 to turn the platform 172 so that the stator axis is turned by an amount sufficient so that the next sensor traverse will indicate little, if any, angular misalignment. Progressively, corrections up to the limit of accuracy of the sensor may be effected by several successive traverses of the sensor 160.

Furthermore, the motor 200, and hydraulic cylinders 204, 206, 234 and 236 can be manually energized. To accomplish this the voltage output of sensor 160 is observed on a voltmeter, and the operator can actuate the appropriate switch to move platform 172 up or down, sideways or to skew it until the voltage reading from the sensor is zero.

Since the stator bore is ordinarily reasonably precisely lined with its axis parallel to the bottom of its feet or support or mounting brackets, no provision need be made for angular adjustments of the stator in a vertical plane about a horizontal axis. However, this can be readily provided for by placing a tiltable second table on top of table 168, and pivoting or brinding the front edge of the second table to table 168, and providing a hydraulic cylinder or a screw thread and nut assembly at the rear end of the second table and raising or lowering the second table therewith to provide for angular corrections along the horizontal axis at the front hinge much as the angular adjustment is made on a vertical axis via lever 218, pivot 220 and cylinders 204 and 206. The sensor 160 can sense the necessary misalignment and enable the receiver to operate the motor.

What is claimed is:

1. Apparatus suitable for removing a resinous coating from a cylindrical metal surface of a motor stator, comprising a base, an upright frame on the base, a support table on the base for mounting a motor stator and spaced from the frame, a shaft rotatably mounted on the frame with axis directed toward the support table, means for rotating the shaft, means for moving one of the frame and table toward and away from each other, an arm mounted on the end of the shaft nearer the table and extending substantially laterally of the shaft, means for mounting a spindle on the arm member and being movable along the arm to a selected position radially from the axis of the shaft, whereby the spindle is movable in a circular path of travel along a radius from the shaft axis, means for rotating the spindle, means for moving the table vertically, laterally, in a horizontal plane and angularly about a vertical axis with respect to the base to align the axis of a motor stator into coaxial alignment with the shaft, abrasion means mounted on the spindle capable of removing excess resin from the cylindrical metal surface of the stator, sensing means on the spindle for measuring any misalignment of the axis of the cylindrical metal surface with the shaft as the sensing means is revolved within the stator, and means cooperatively associated with the sensing means and the means for moving the table whereby the stator axis is in concentric alignment with the shaft, the stator is aligned so that the abrasion means can remove substantially all the resin from the cylindrical metal surface.

2. The apparatus of claim 1 wherein the means for mounting the spindle includes a mounting arm and movable lever means to which is attached the spindle means for controlled fine movement of the spindle means whereby the grinding means on the spindle can be adjustably movable radially into and out of contact with the resinous coating on the stator surface.

3. The apparatus of claim 2 wherein the means for mounting the spindle means includes a lever-actuating means between the mounting arm and the lever means for positioning the grinding means against the resinous coating.

4. The apparatus of claim 3 wherein the lever-actuating means includes a fluid operated bellows.

5. The apparatus of claim 1 wherein the sensing means and the grinding means are detachably and interchangeably mounted on the spindle.

6. The apparatus of claim 1 wherein the means for moving the table vertically, laterally, and angularly about a vertical axis comprise electrically operated mechanisms controlled by electrical signals derived from the sensing means.

7. An apparatus for automatically aligning the axis of a cylindrical workpiece with the axis of a shaft of said apparatus and for thereafter performing work on said cylindrical workpiece which work is parallel to and at a fixed distance from the axis of said cylindrical workpiece comprising:
   1. a flat base;
   2. a frame mounted on said base;
   3. means for afixing said cylindrical workpiece to said base with its axis parallel thereto;
   4. means for altering the distance between said frame and said cylindrical workpiece along a first line parallel to said base;
   5. first non-manual means for moving one of said frame and said cylindrical workpiece along a second line perpendicular to said base;

6. second non-manual means for moving one of said frame and said cylindrical workpiece along a line perpendicular to said first line and parallel to said base;
7. third non-manual means for rotating one of said frame and said cylindrical workpiece about a line perpendicular to said base;
8. a shaft mounted on said frame parallel to said base and rotatable relative to said frame;
9. means for rotating said shaft;
10. an arm mounted on said shaft and extending substantially laterally therefrom;
11. means for mounting a tool on said arm for performing work on said cylindrical workpiece;
12. sensor means mounted on said arm, the output of which is an electrical signal proportional to the distance between said sensor means and said cylindrical workpiece;
13. means for determining the position of said sensor means relative to the ends of said cylindrical workpiece, to a third line perpendicular to the axis of said cylindrical workpiece, and to a fourth line perpendicular to said third line and perpendicular to the axis of said cylindrical workpiece;
14. electrical means for comparing the output of said sensor means at three pairs of positions, the first pair being the positions of said sensor means when it crosses said third line and 180° thereof, the second pair being the positions of said sensor means when it crosses said fourth line and 180° thereof, and the third pair being the positions of said sensor means when it is near each end of said cylindrical workpiece, and, if the outputs of said sensor means at any of the two positions of one of said pairs of positions are unequal, for causing at least one of said non-manual means to move at least one of said frame and said cylindrical workpiece so that said outputs are more equal.

8. An apparatus according to claim 7 wherein said second and third lines are parallel.

9. An apparatus according to claim 8 wherein said electrical means comprises three electrical circuits, a circuit for comparing the outputs of said sensor means at the two positions of said first pair of positions and for activating said first non-manual means if said outputs are unequal, a circuit for comparing the outputs of said sensor means at the two positions of said second pair of positions and for activating said second non-manual means if said outputs are unequal, and a circuit for comparing the outputs of said sensor means at the two positions of said third pair of positions and for actuating said third non-manual means if said outputs are unequal.

10. An apparatus according to claim 9 wherein said three electrical circuits are three two-stage DC servo-amplifiers.

11. An apparatus according to claim 7 wherein said base is horizontal.

12. An apparatus according to claim 7 wherein all of said non-manual means move said cylindrical workpiece.

13. An apparatus according to claim 7 wherein said sensor means is a magnetic proximity switch.

14. An apparatus according to claim 7 including means for moving said sensor means along a line parallel to said shaft.

15. An apparatus according to claim 7 wherein said means for determining the position of said sensor means includes a slip ring having contacts at the 0°, 90°, 180° and 270° positions which are contacted by a contact brush moving in synchronism with said shaft.

16. An apparatus according to claim 7 including a tool mounted by said means for mounting a tool.

17. An apparatus according to claim 16 wherein said tool is a grinder.

* * * * *